(12) United States Patent
Tanaka

(10) Patent No.: US 11,385,523 B2
(45) Date of Patent: Jul. 12, 2022

(54) OPTICAL ASSEMBLY DRIVING APPARATUS, IMAGING APPARATUS AND PORTABLE ELECTRONIC DEVICE

(71) Applicant: AAC Optics Solutions Pte. Ltd., Singapore (SG)

(72) Inventor: Hirokazu Tanaka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 54 days.

(21) Appl. No.: 17/078,117

(22) Filed: Oct. 23, 2020

(65) Prior Publication Data
US 2022/0100051 A1    Mar. 31, 2022

(30) Foreign Application Priority Data
Sep. 29, 2020   (JP) .............................. JP2020-163414

(51) Int. Cl.
*G03B 5/02*    (2021.01)
*H04N 5/225*   (2006.01)

(52) U.S. Cl.
CPC ............. *G03B 5/02* (2013.01); *H04N 5/2253* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS

| 6,067,421 A * | 5/2000 | Kitazawa ............. H04N 5/2253 396/133 |
| 2006/0001759 A1* | 1/2006 | Raschke .................. G03B 5/00 348/335 |
| 2006/0115256 A1* | 6/2006 | Nomura ............... H04N 5/2253 396/55 |

(Continued)

FOREIGN PATENT DOCUMENTS

| JP | 1987255927 A1 | 11/1987 |
| JP | 2006284725 A1 | 10/2006 |

OTHER PUBLICATIONS

1st Office Action dated Dec. 22, 2020 by JPO in related Japanese Patent Application No. 2020163414 (8 Pages).

*Primary Examiner* — William B Perkey
(74) *Attorney, Agent, or Firm* — W&G Law Group

(57) ABSTRACT

The present disclosure provides an optical assembly driving apparatus, an imaging apparatus and a portable electronic device, including an actuator unit and a lifting unit configured to support an optical assembly. The actuator unit includes an electromagnetic motor serving as a driving source and a transmission mechanism transmitting a driving force to the lifting unit. The transmission mechanism includes a spindle and a connecting plate sleeved on the spindle and movable along an axial direction of the spindle. The connecting plate is connected with the lifting unit, and the driving force generated by the electromagnetic motor controls lifting of the lifting unit through the connecting plate. Compared with a bending optical system in the existing technology, the optical assembly driving apparatus of the present disclosure can save a three-dimensional space of the imaging apparatus and enable a lens group to have high-resolution optical system performance in the photographing state.

11 Claims, 24 Drawing Sheets

(56) References Cited

U.S. PATENT DOCUMENTS

| | | | |
|---|---|---|---|
| 2007/0019950 A1* | 1/2007 | Tanaka | G03B 17/02 |
| | | | 396/462 |
| 2007/0036538 A1* | 2/2007 | Cho | G02B 7/026 |
| | | | 396/349 |
| 2007/0077052 A1* | 4/2007 | Chang | H04N 5/23212 |
| | | | 396/144 |
| 2008/0101790 A1* | 5/2008 | Hagiwara | G03B 17/12 |
| | | | 396/429 |
| 2009/0066829 A1* | 3/2009 | Iwasaki | G03B 11/043 |
| | | | 348/340 |
| 2010/0091122 A1* | 4/2010 | Irisawa | H04N 5/23287 |
| | | | 348/208.7 |
| 2013/0155238 A1* | 6/2013 | Scudder | G03B 29/00 |
| | | | 348/148 |
| 2013/0300922 A1* | 11/2013 | Okano | G03B 3/10 |
| | | | 348/373 |
| 2018/0113287 A1* | 4/2018 | Noda | G02B 7/10 |
| 2018/0243810 A1* | 8/2018 | Costa | G03B 11/04 |
| 2019/0129466 A1* | 5/2019 | Zeng | G06F 1/1605 |
| 2021/0247589 A1* | 8/2021 | Ito | G03B 17/04 |

* cited by examiner

OPTICAL ASSEMBLY DRIVING APPARATUS, IMAGING APPARATUS AND PORTABLE ELECTRONIC DEVICE

TECHNICAL FIELD

The present disclosure relates to a portable electronic device, in particular to an imaging apparatus used in the portable electronic device and an optical assembly driving apparatus used in the imaging apparatus.

BACKGROUND

With the continuously increasing requirements for high-pixelation and high-quality optical systems of imaging components in recent years, optical assembly driving apparatuses are widely used in many photographic apparatuses. It has been accepted by consumers that the optical assembly driving apparatuses are applied to various portable electronic devices, in particular to, for example, mobile phones, tablet computers, etc.

In a driving mechanism of an optical assembly driving apparatus suitable for general portable electronic devices, a lens group is fixed to an imaging component, or an optical system with magnification is used. However, since it is difficult to mount a small optical apparatus, while keeping its original shape, on, for example, a portable electronic device and a high-magnification optical system with a long optical total length, a bending structure is required.

In an optical system using the bending structure, a prism and a mirror for bending light are configured in front of and behind the optical system. In the portable electronic devices that are becoming increasingly miniaturized, a total length of the bending optical system becomes longer, and a mounting area occupation rate of the portable electronic device increases, which may hinder the miniaturization.

Therefore, it is necessary to provide a new optical assembly driving apparatus, an imaging apparatus and a portable electronic device that can solve the above problems.

SUMMARY

The present disclosure is made in view of the above problems, and the objective of the present disclosure is to realize a space-saving optical assembly driving apparatus, an imaging apparatus, and a portable electronic device, which do not deteriorate the performance of an optical system with high resolution and do not increase a three-dimensional space like a bending optical system in the existing technology.

The objective of the present disclosure is achieved in the following manner. In addition, in the following description, in order to facilitate the understanding of the present disclosure, reference numerals are marked with parentheses, but the various structural components of the present disclosure are not limited to the marked numerals, and should be interpreted broadly within the range that may be understood technically by those skilled in the art.

In order to solve the above technical problems, the present disclosure provides an optical assembly driving apparatus, including an actuator unit and a lifting unit supporting an optical assembly. The actuator unit includes an electromagnetic motor serving as a driving source and a transmission mechanism transmitting a driving force to the lifting unit. The transmission mechanism includes a spindle and a connecting plate sleeved on the spindle and movable along an axial direction of the spindle. The connecting plate is connected with the lifting unit, and the driving force generated by the electromagnetic motor controls lifting of the lifting unit through the connecting plate.

Preferably, the transmission mechanism further includes a driving gear mounted on the electromagnetic motor, an intermediate gear engaged with the driving gear, a driven gear engaged with the intermediate gear, a screw fixed to the driven gear and a nut threaded to the screw, the nut abuts against the connecting plate, and axes of the driving gear, the intermediate gear, the driven gear and the screw are parallel to an optical axis of the optical assembly and an axis of the electromagnetic motor.

Preferably, the nut has a nut protrusion configured to prevent the nut from rotating.

Preferably, the connecting plate has a connecting plate protrusion configured to prevent the connecting plate from rotating.

Preferably, a surface of the nut adjacent to the driven gear is provided as a nut inclined surface.

Preferably, the lifting unit includes a countershaft, a lifting plate sleeved on the countershaft and movable along an axial direction of the countershaft, and a spring sleeved on the countershaft and configured to apply an elastic force to the lifting plate along the axial direction of the countershaft.

Preferably, the lifting plate has a lifting plate protrusion configured to prevent the lifting plate from rotating about the countershaft.

Preferably, the lifting unit includes a leaf spring, and the leaf spring has one end fixed on the lifting plate and one other end abutting against the connecting plate and configured to apply an elastic force to the connecting plate.

Preferably, the actuator unit includes a position detection sensor.

The present disclosure further provides an imaging apparatus, including a housing, an optical assembly and the above-described optical assembly driving apparatus. The optical assembly is driven by the optical assembly driving apparatus in such a way that the optical assembly extends out or retracts to the housing along an optical axis direction.

Preferably, the optical assembly includes a telescopic cylindrical member arranged between the housing and the lifting plate.

Preferably, the housing further includes a housing fitting portion configured to prevent the lifting plate of the optical assembly driving apparatus from rotating.

The present disclosure further provides a portable electronic device including the above-described imaging apparatus.

The advantages of the present disclosure lie in that, compared with a bending optical system described in the existing technology, the optical assembly driving apparatus of the present disclosure can save a three-dimensional space of the imaging apparatus and enable a lens group to have high-resolution optical system performance in the photographing state. The optical assembly driving apparatus of the present disclosure may miniaturize the imaging apparatus in a thickness direction through a structure in which members such as the optical system, a member holding the optical system, an anti-shake-focus-adjustment assembly, etc. are accommodated in the housing during non-photography.

Therefore, the present disclosure can realize an imaging apparatus with high-pixelation and high-performance, and achieve the purpose of establishing a camera mechanism with higher efficiency in the portable electronic device which is increasingly miniaturized, thereby improving the quality of the photographed image.

REFERENCE NUMERALS

Figure 1:
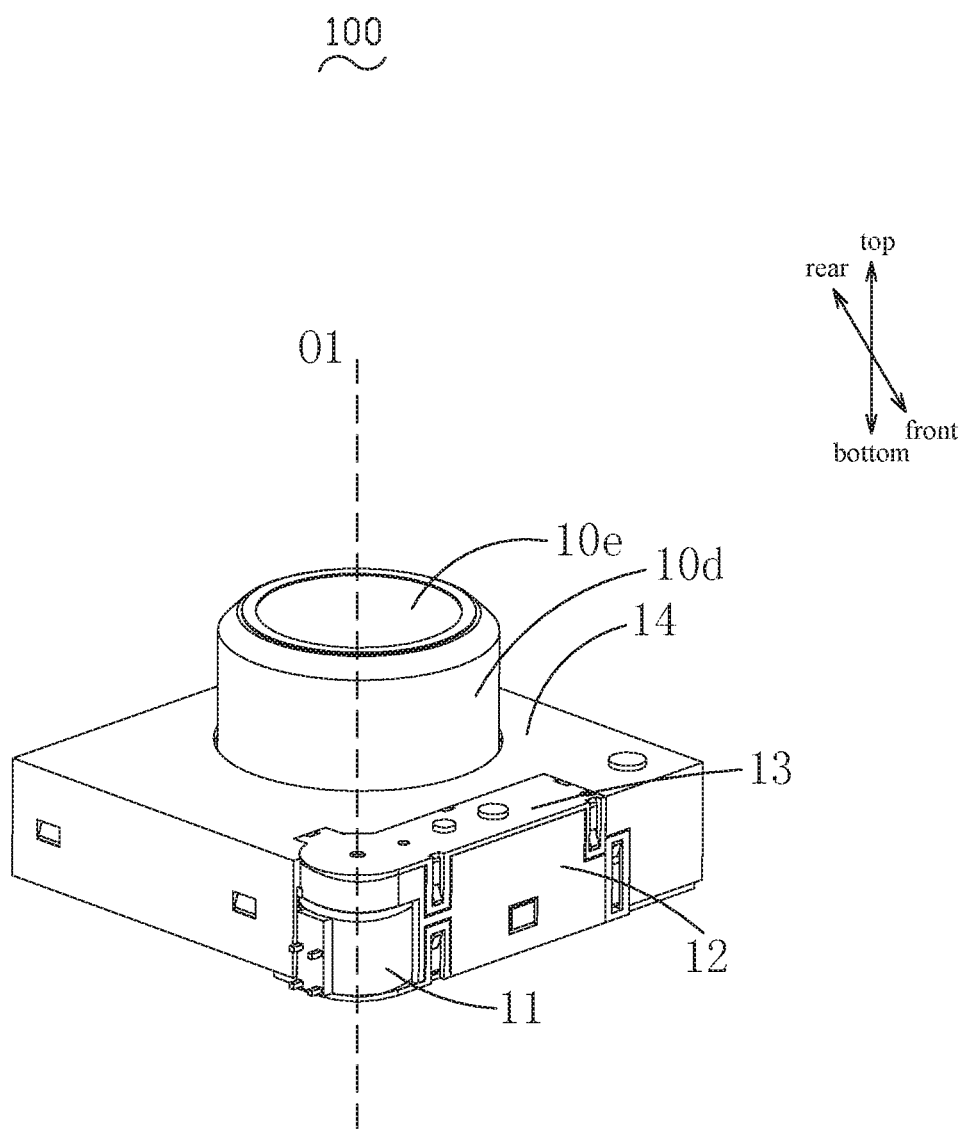
FIG. 1 is a perspective view of an imaging apparatus according to an embodiment of the present disclosure as viewed from front-left-top.
Figure 2:
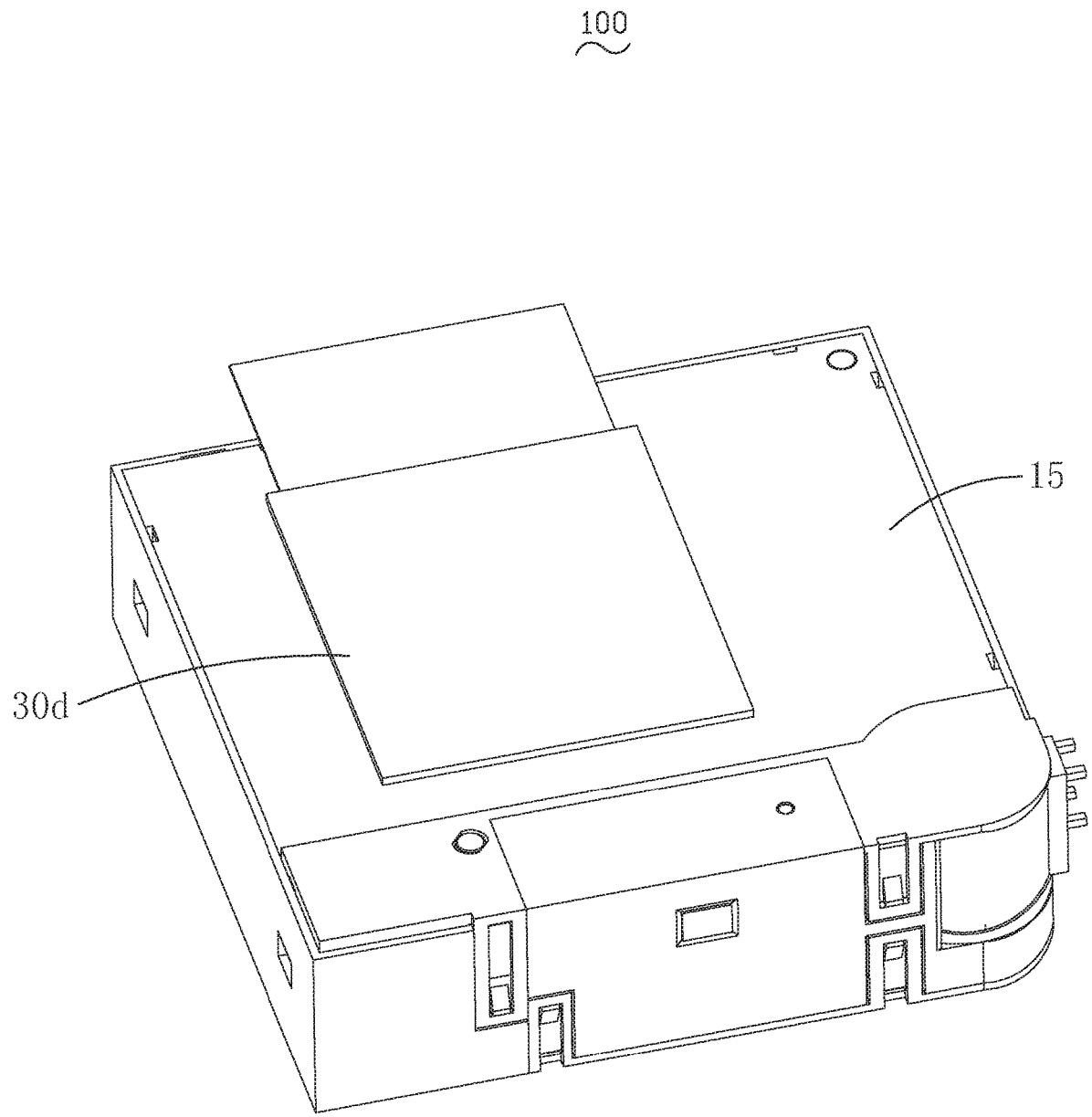
FIG. 2 is a perspective view of the imaging apparatus according to the embodiment of the present disclosure as viewed from front-right-bottom.

10a . . . Lens group
10b . . . Lens barrel
10c . . . Anti-shake-focus-adjustment assembly
10d . . . Decorative ring
10e . . . Cover glass
11 . . . Electromagnetic motor
12 . . . Actuator housing
12a, 12b . . . Nut fitting portion
12c, 12d . . . Connecting plate fitting portion
12e . . . Actuator claw portion
13 . . . Actuator cover
13a . . . Actuator cover hook portion
14 . . . Housing
14a . . . Housing fitting portion
14b . . . Inner surface
15 . . . Cover
16a . . . Driving gear
16b . . . Intermediate gear
16c . . . Driven gear
16c-1 . . . First cutout
17 . . . Spindle
18a . . . First shaft sleeve
18b . . . Second shaft sleeve
19 . . . Connecting plate
19a . . . Connecting plate protrusion
20 . . . Screw
20a . . . Second cutout
21 . . . Spring
21a . . . Spring hook
23 . . . Leaf spring
24 . . . Countershaft
25 . . . Nut
25a . . . Nut protrusion
25b . . . Nut inclined surface
26 . . . Lifting plate
26a . . . Lifting plate protrusion
26b . . . Boss shape
27 . . . Tube member
28 . . . Flexible printed circuit board
29 . . . Position detection sensor
30a . . . Imaging component
30b . . . Imaging component housing
30c . . . Infrared cut filter 30d . . . Imaging component substrate
100 . . . Imaging apparatus
200 . . . Portable electronic device
O1 . . . Optical axis
O2 . . . Rotation direction of lifting plate
S1 . . . First gap
S2 . . . Second gap

DETAILED DESCRIPTION

The present disclosure is described in detail below with reference to the accompanying drawings.

As shown in FIGS. 1 to 16, an imaging apparatus 100 according to the present disclosure includes a cover 15, a housing 14 mounted on the cover 15 and forming an accommodation space with the cover 15, an optical assembly extendable out of the housing 14 along an optical axis O1, an optical assembly driving apparatus arranged in the housing 14 for driving the optical assembly up and down, and an imaging assembly arranged at the bottom of the cover 15.

FIGS. 1 to 13 show the optical assembly driving apparatus and the imaging apparatus according to an embodiment of the present disclosure and their structural elements. An imaging optical system of the imaging apparatus 100 includes a lens group 10a of the optical assembly, and an infrared cut filter 30c and an imaging component 30a of the imaging assembly.

When imaging, a light beam from an object incident along the optical axis O1 passes through a cover glass 10e, and passes through the lens group 10a and the infrared cut filter 30c to form an image on an imaging surface of the imaging component 30a.

As shown in FIGS. 1 to 6 and 18, the optical assembly driving apparatus includes an actuator unit and a lifting unit supporting the optical assembly. The actuator unit includes an electromagnetic motor 11 serving as a driving source and a transmission mechanism transmitting a driving force to the lifting unit. The transmission mechanism includes a spindle 17 and a connecting plate 19 sleeved on the spindle 17 and movable along an axial direction of the spindle. The connecting plate 19 is connected with the lifting unit, and the driving force generated by the electromagnetic motor 11 controls lifting of the lifting unit through the connecting plate 19.

Therefore, the lifting unit may drive the optical assembly to move up and down along the direction of the optical axis O1. That is, in a photographing state, the actuator unit controls the lifting unit to ascend, and the optical assembly extends out of the housing 14 along the optical axis O1. In the non-photographing state, the actuator unit controls the lifting unit to descend, and the optical assembly retracts into the housing 14.

With the above structure, compared with a bending optical system described in the existing technology, the optical assembly driving apparatus of the present disclosure can save a three-dimensional space of the imaging apparatus and enable the lens group to have high-resolution optical system performance in the photographing state.

In the present disclosure, the electromagnetic motor 11 may directly or indirectly control the connecting plate 19 to move along the axial direction of the spindle 17.

Figure 18:
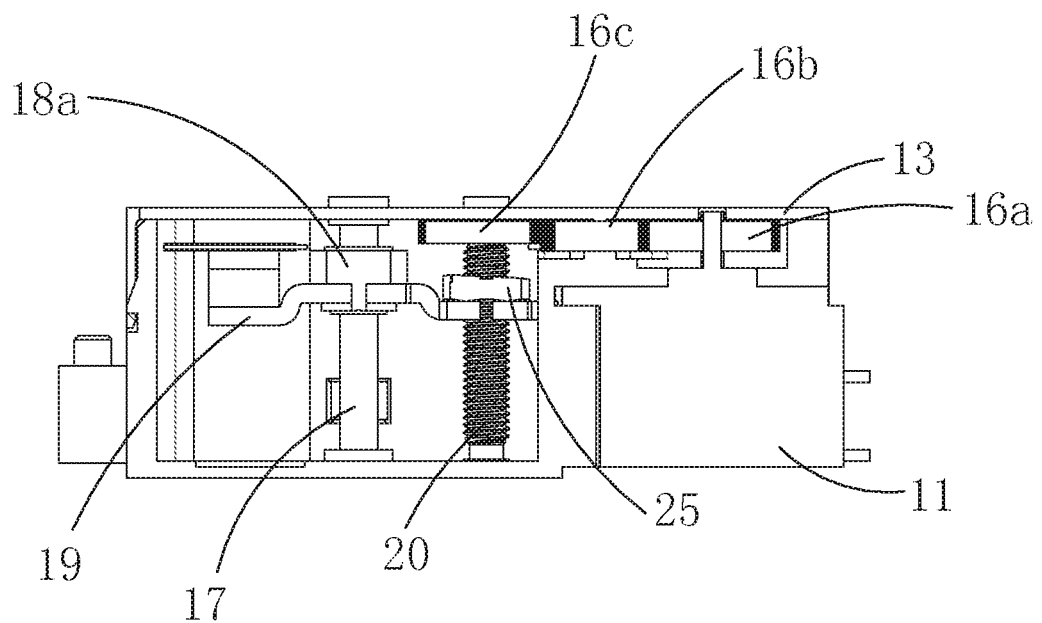
FIG. 18 is a detailed view of an actuator unit in the imaging apparatus according to the embodiment of the present disclosure.

As shown in FIG. 18, the connecting plate 19 is used to control the lifting unit connected to the connecting plate 19 to move up and down after receiving the driving force from the electromagnetic motor 11. Specifically, the transmission mechanism may further include a driving gear 16a mounted on the electromagnetic motor 11, an intermediate gear 16b engaged with the driving gear 16a, a driven gear 16c engaged with the intermediate gear 16b, a screw 20 fixed to the driven gear 16c and a nut 25 threaded to the screw 20. The nut 25 abuts against the connecting plate 19. Axes of the driving gear 16a, the intermediate gear 16b, the driven gear 16c and the screw 20 are parallel to an optical axis of the optical assembly and an axis of the electromagnetic motor 11. The driving force generated by the electromagnetic motor 11 controls the lifting unit connected to the connecting plate 19 to move up and down through the above components. According to the transmission mechanism of the present disclosure, the optical assembly driving apparatus may have a compact structure and excellent transmission effect.

Figure 7:
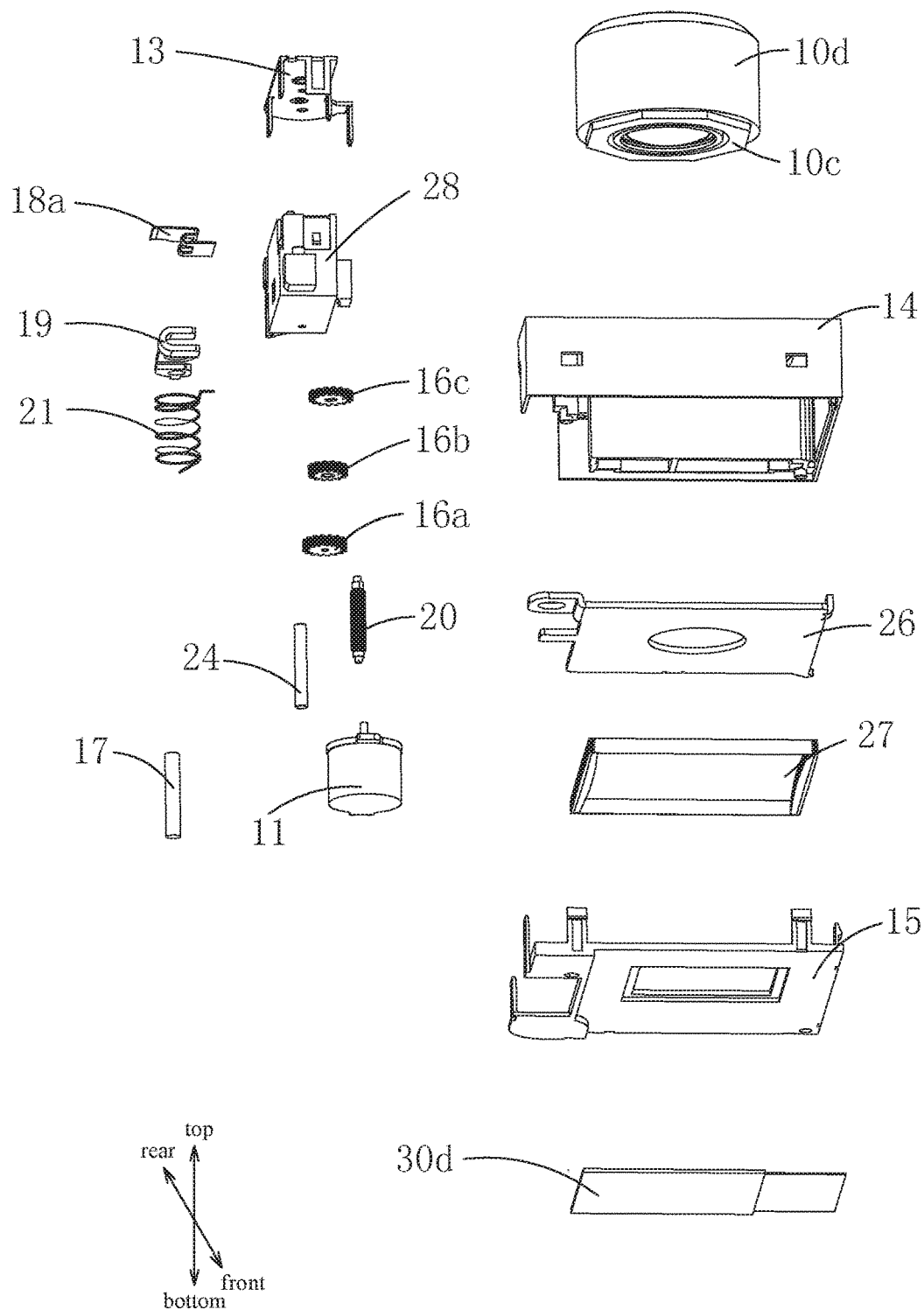
FIG. 7 is an exploded view of the imaging apparatus according to the embodiment of the present disclosure as viewed from the right-bottom.

As shown in FIG. 7, the actuator unit may further include a flexible printed circuit board 28 provided with a position detection sensor 29. The flexible printed circuit board 28 is connected to an external control system. The external control system may control the electromagnetic motor 11 based on information obtained from the position detection sensor 29. By providing the position detection sensor 29, a position of the optical assembly mounted on the lifting plate 26 when moving in the optical axis direction may be detected.

Figure 3:
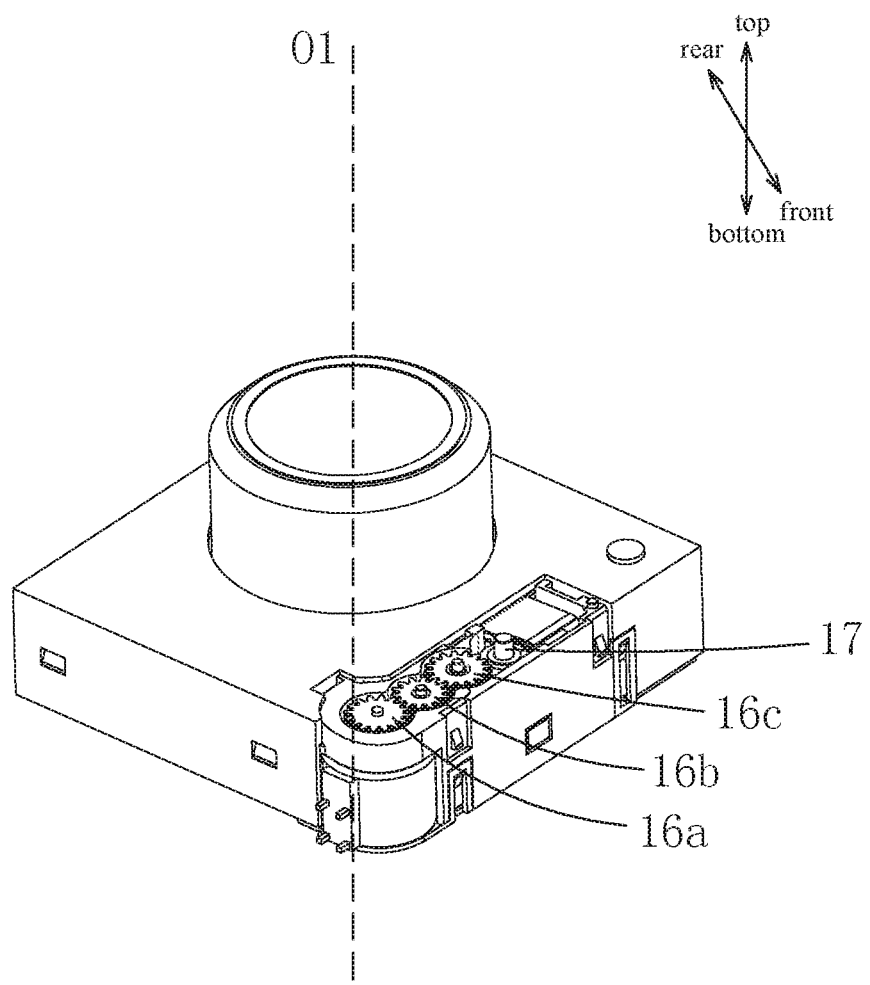
FIG. 3 is a perspective view of the imaging apparatus according to the embodiment of the present disclosure with an actuator cover removed as viewed from front-left-top.
Figure 4:
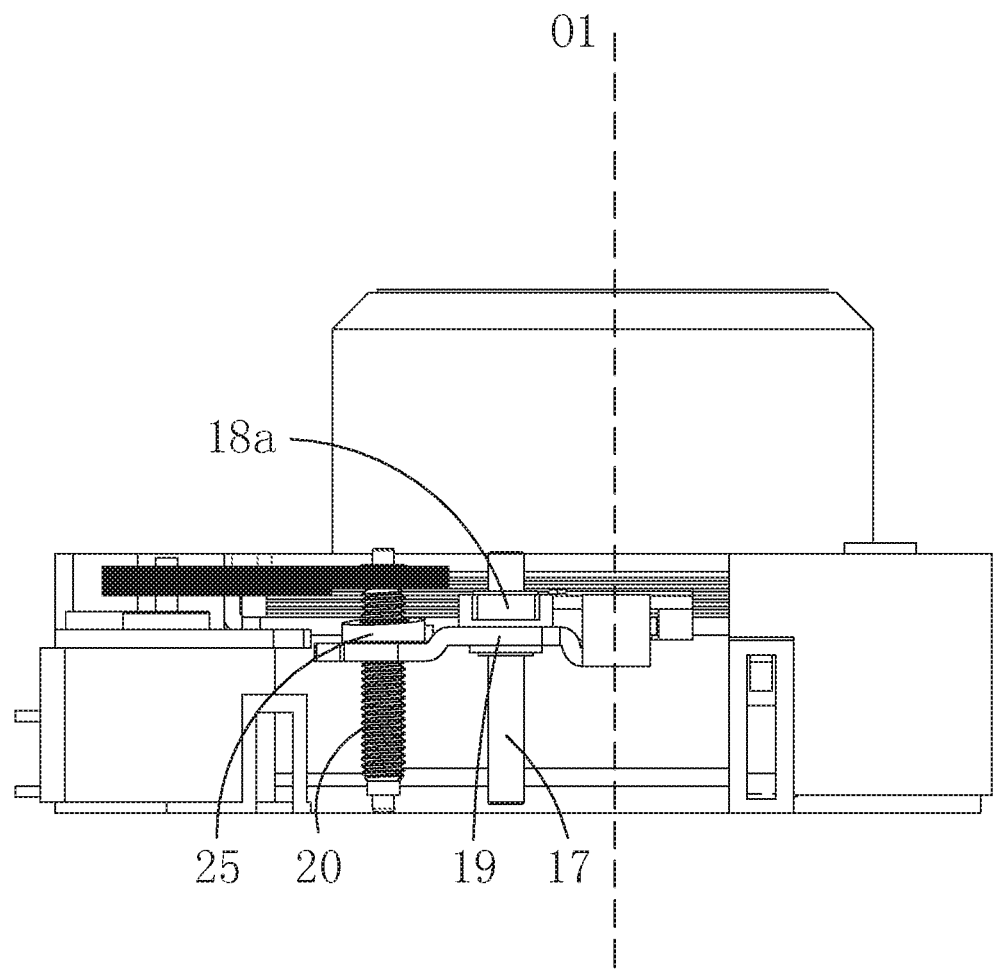
FIG. 4 is a front view of the imaging apparatus according to the embodiment of the present disclosure with an actuator housing and the actuator cover removed as viewed from the front.
Figure 6:
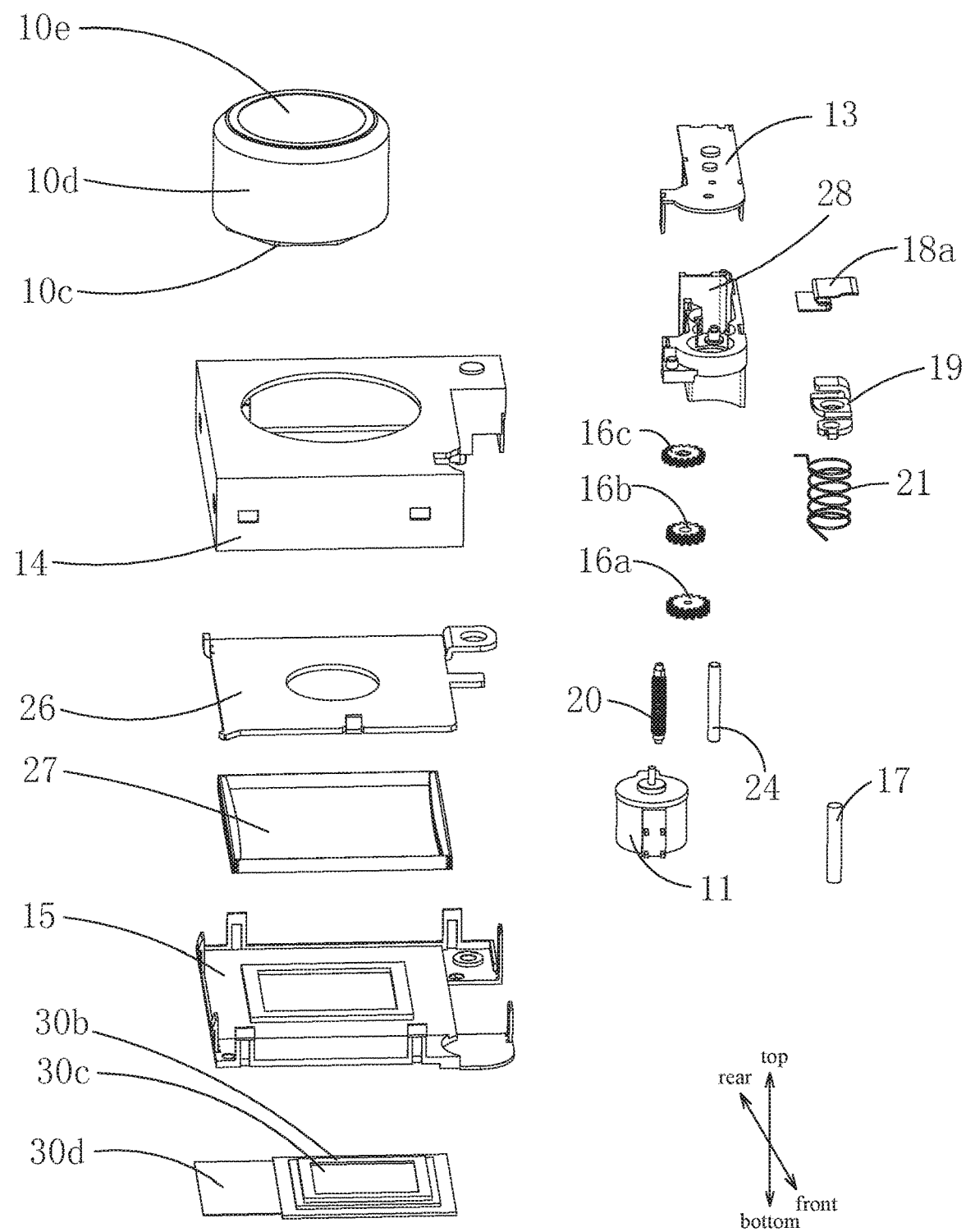
FIG. 6 is an exploded view of the imaging apparatus according to the embodiment of the present disclosure as viewed from the left-top.
Figure 14:
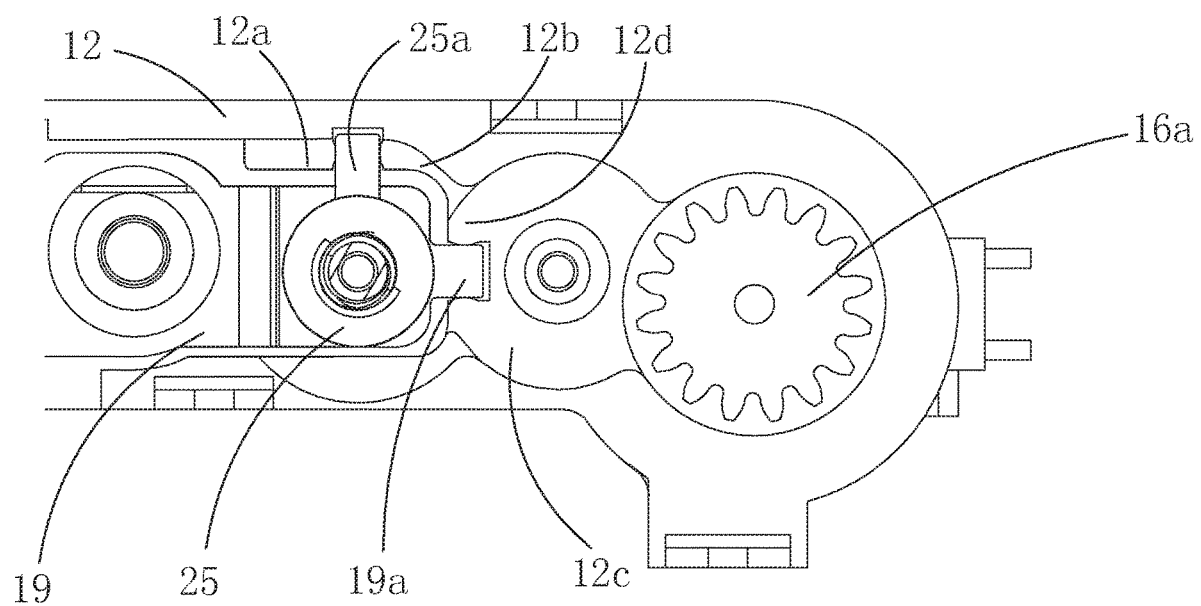
FIG. 14 is an enlarged view of a nut-to-nut fitting portion and a connecting plate-to-connecting plate fitting portion of the imaging apparatus according to the embodiment of the present disclosure.

As shown in FIGS. 3, 4 and 6, the driving gear 16a is press-fitted and fixed to a rotation shaft of the electromagnetic motor 11. The actuator unit further includes an actuator housing 12 for holding the electromagnetic motor 11 and an actuator cover 13 fixed on the actuator housing 12. The intermediate gear 16b, the driven gear 16c, the screw 20 and the spindle 17 are supported by the actuator housing 12 and/or the actuator cover 13. The intermediate gear 16b is provided between the driving gear 16a and the driven gear 16c, thereby transmitting a driving force of the driving gear 16a to the driven gear 16c. The screw 20 is threadedly fitted with the nut 25, and the nut 25 abuts against the connecting plate 19. As shown in FIG. 14, the nut 25 further has a nut protrusion 25a which prevents the nut 25 from rotating, and the nut protrusion 25a restricts the rotational movement of the nut 25 in such a manner as to be sandwiched by the nut fitting portions 12a, 12b of the actuator housing 12, so that the nut 25 moves only in an axial direction of the screw 20 relative to the screw 20.

In addition, as shown in FIG. 7, the connecting plate 19 may be fixed on a first shaft sleeve 18a, and the first shaft sleeve 18a may move in an axial direction of the spindle 17 relative to the spindle 17. When the first shaft sleeve 18a moves along the axial direction of the spindle 17, the connecting plate 19 follows the first shaft sleeve 18a to move along the axial direction of the spindle 17. As shown in FIG. 14, the connecting plate 19 has a connecting plate protrusion 19a which prevents the connecting plate 19 from rotating, and the connecting plate protrusion 19a restricts the rotational movement of the connecting plate 19 in such a manner as to be sandwiched by the connecting plate fitting portions 12c, 12d of the actuator housing 12, so that the connecting plate 19 moves only in the axial direction of the spindle 17. The actuator unit is preferably disposed at one side of the optical assembly within the housing 14.

Figure 15:
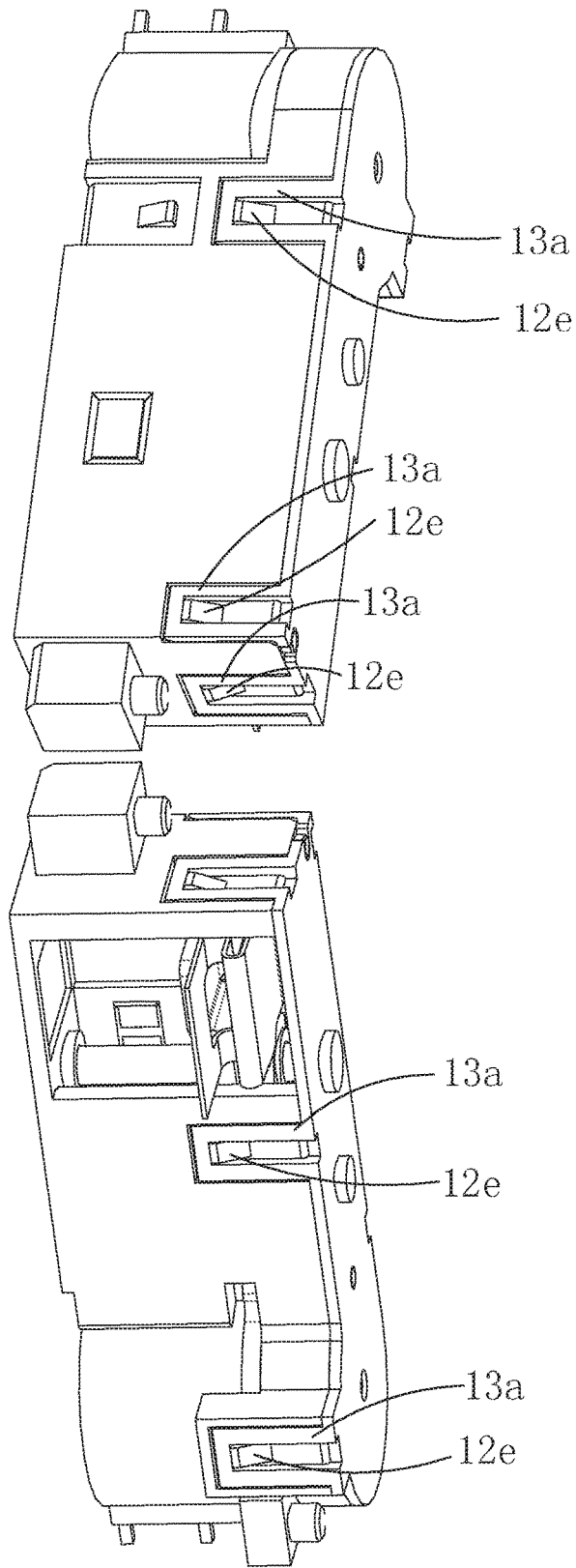
FIG. 15 is a diagram with reference numerals of an actuator housing and an actuator cover hook portion of the imaging apparatus according to the embodiment of the present disclosure.

As shown in FIG. 15, the actuator cover 13 has an actuator cover hook portion 13a, and the actuator cover hook portion 13a is engaged with and fixed to an actuator claw portion 12e of the actuator housing 12. According to this structure, the actuator unit may be easily assembled and has a compact structure.

Figure 16:
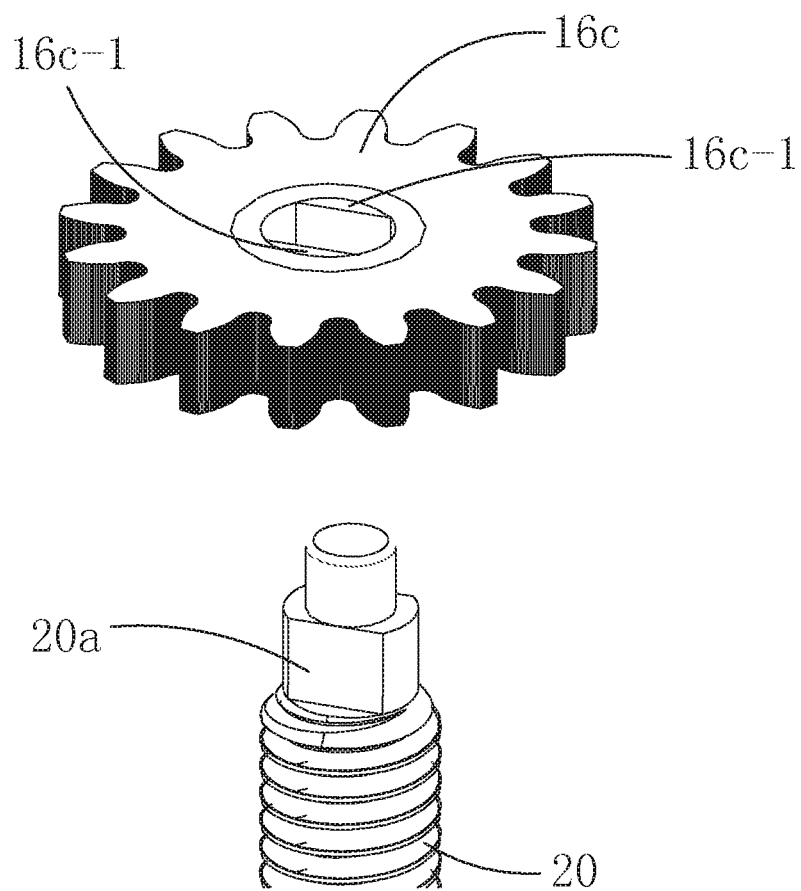
FIG. 16 is a detailed view of a rotation restricting portion of a screw and a nut of the imaging apparatus according to the embodiment of the present disclosure.

As shown in FIG. 16, the driven gear 16c has a first cutout 16c-1, and the screw 20 has a second cutout 20a. By fitting the first cutout 16c-1 and the second cutout 20a, the rotation of the driven gear 16c relative to the screw 20 may be prevented, so that the screw 20 may rotate together with the driven gear 16c.

Figure 5:
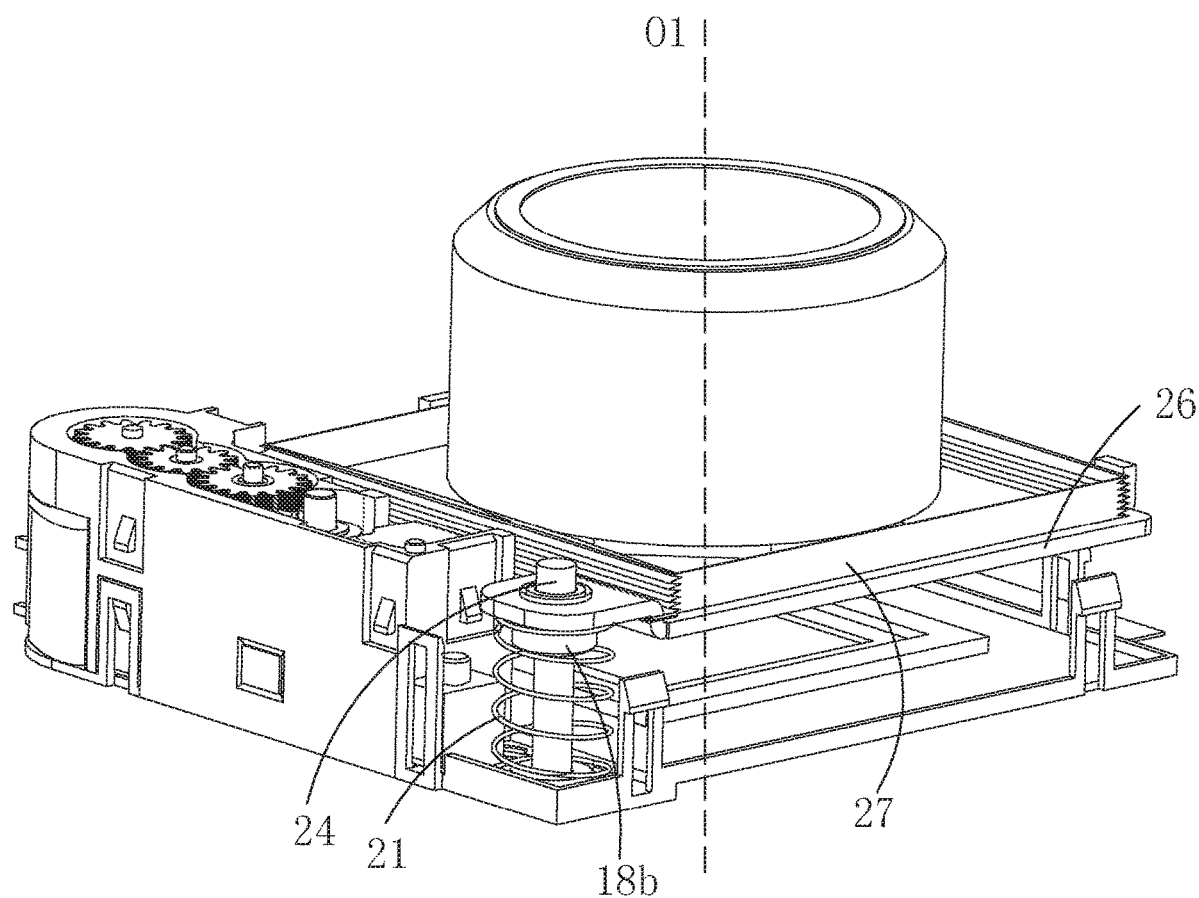
FIG. 5 is a perspective view of the imaging apparatus according to the embodiment of the present disclosure with a housing removed as viewed from the front-right-top.
Figure 10:
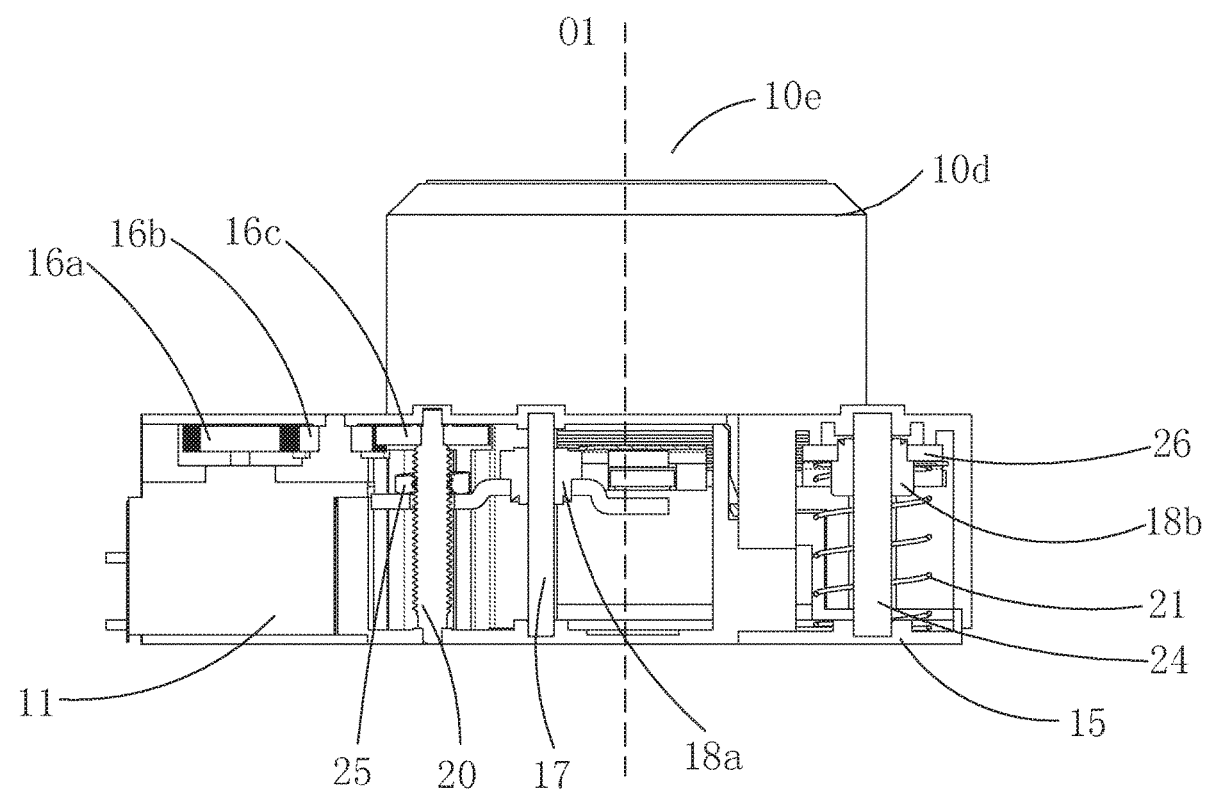
FIG. 10 is a cross-sectional view of the imaging apparatus according to the embodiment of the present disclosure taken from a plane parallel to the optical axis and passing through a spindle and a countershaft.
Figure 11A:
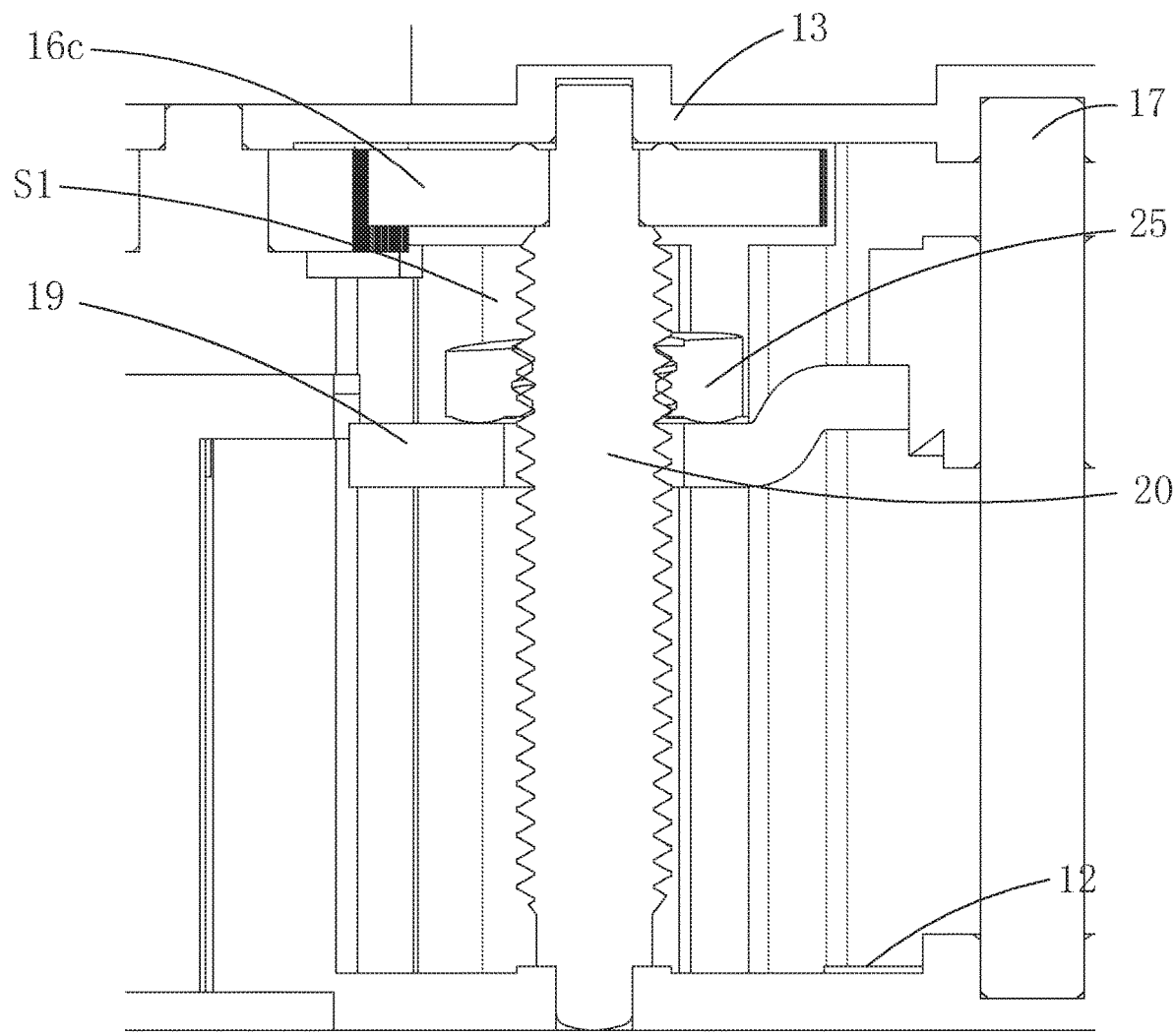
FIG. 11a is an enlarged view of a cross-sectional view of the imaging apparatus according to the embodiment of the present disclosure taken from a plane parallel to the spindle.
Figure 11B:
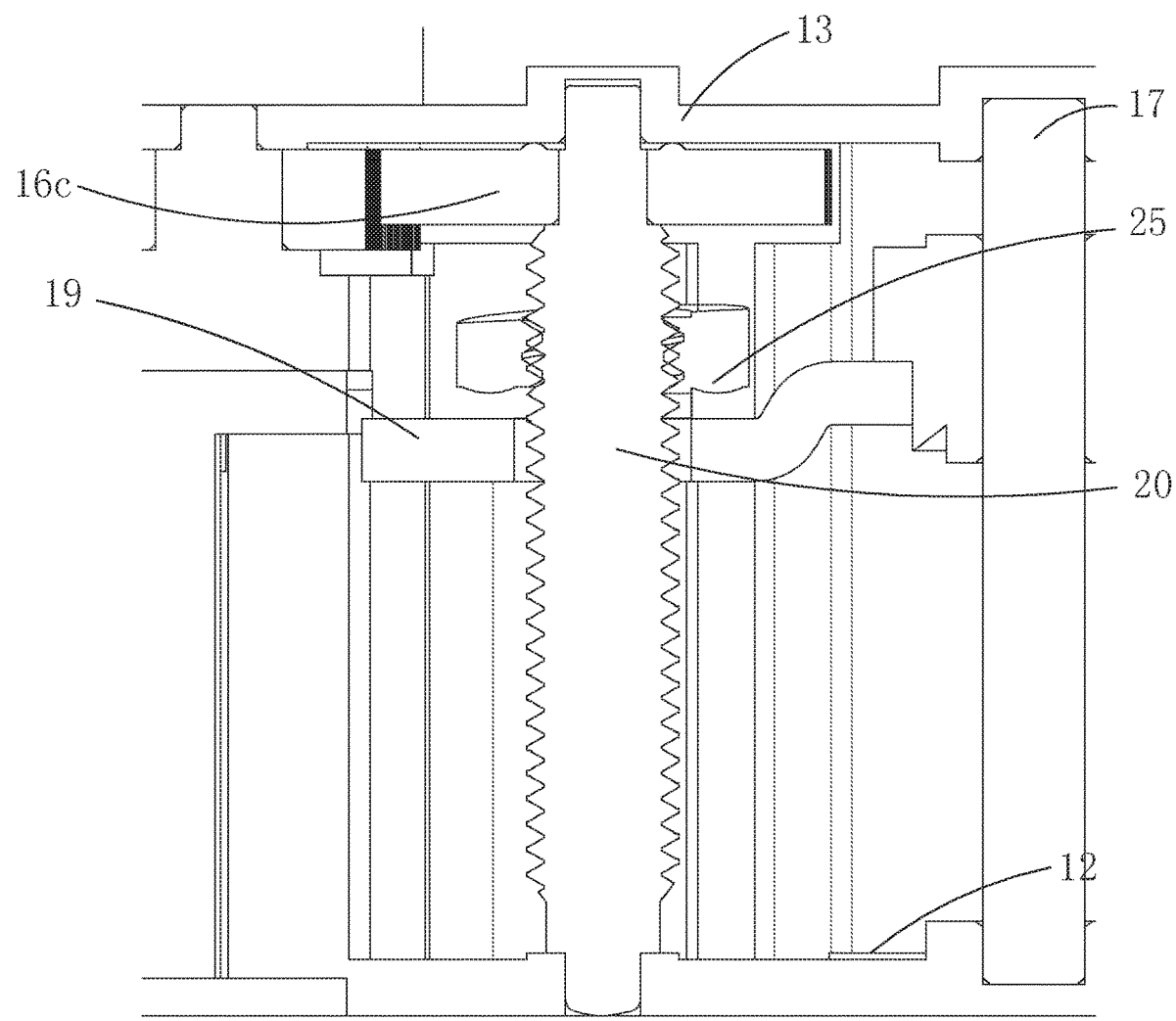
FIG. 11b is an enlarged view of a cross-sectional view of the imaging apparatus according to the embodiment of the present disclosure in a photographing state, taken from a plane parallel to the spindle.
Figure 12:
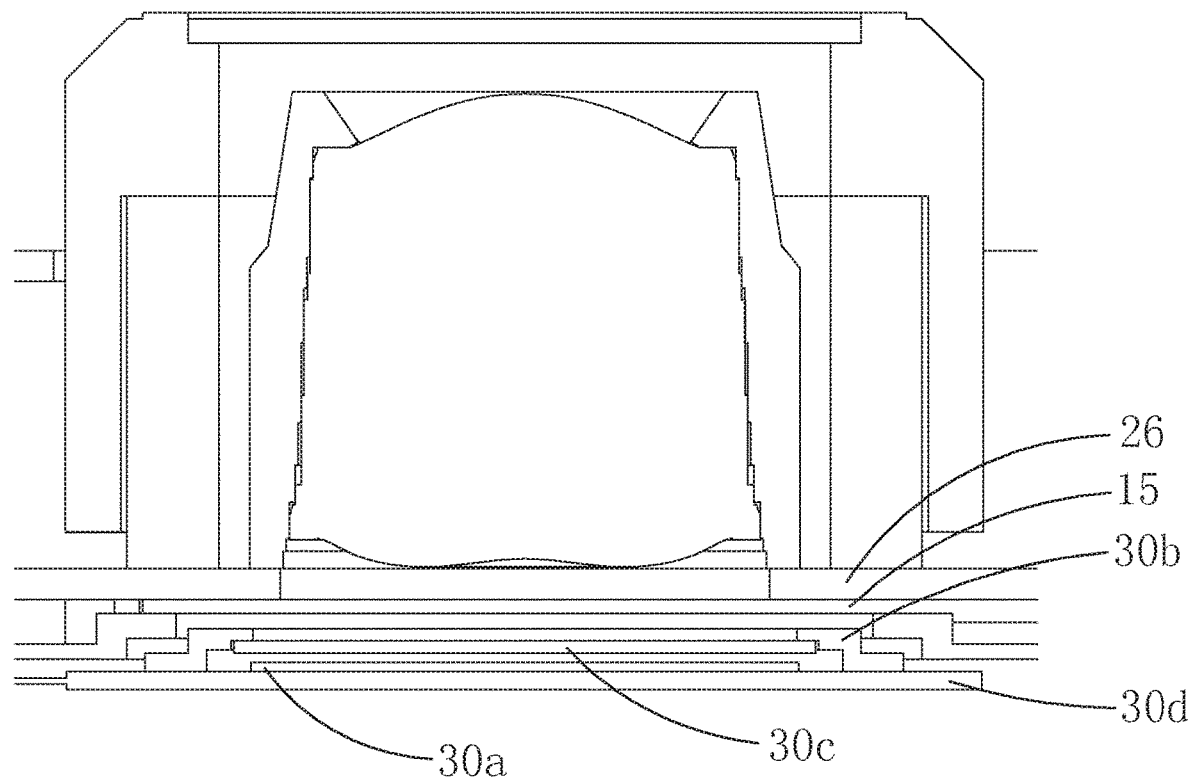
FIG. 12 is an enlarged view of a cross-sectional view of the imaging apparatus according to the embodiment of the present disclosure taken from a plane parallel to the optical axis.
Figure 13:
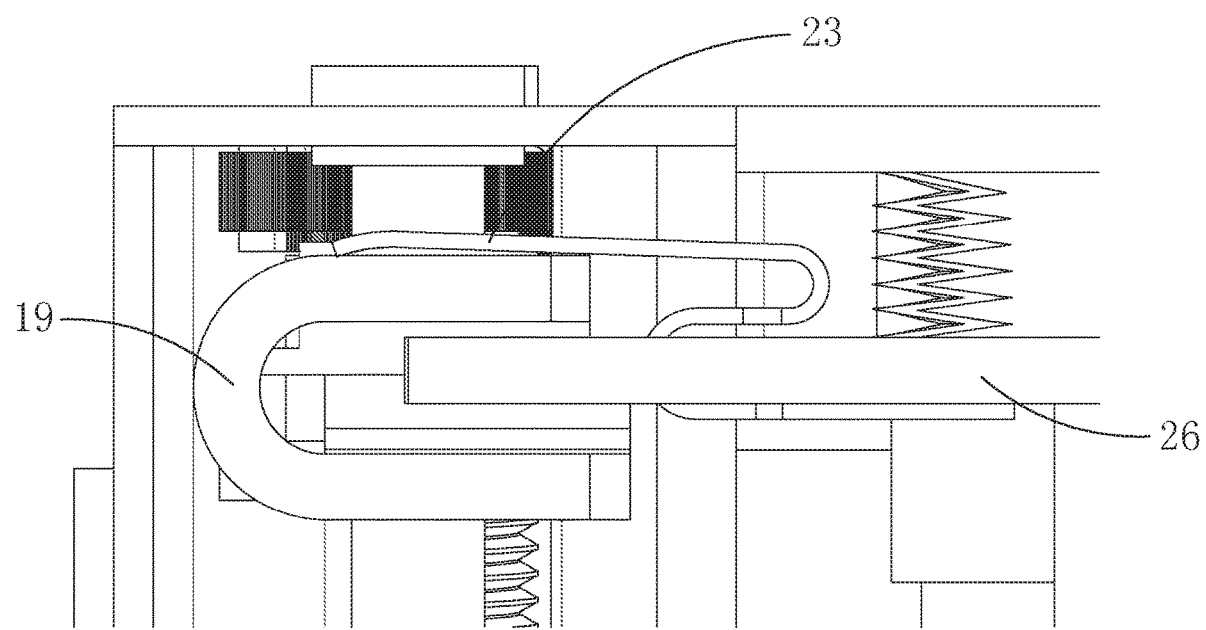
FIG. 13 is an enlarged view of a cross-sectional view of a leaf spring portion of the imaging apparatus according to the embodiment of the present disclosure taken from a plane parallel to the optical axis.
Figure 21:
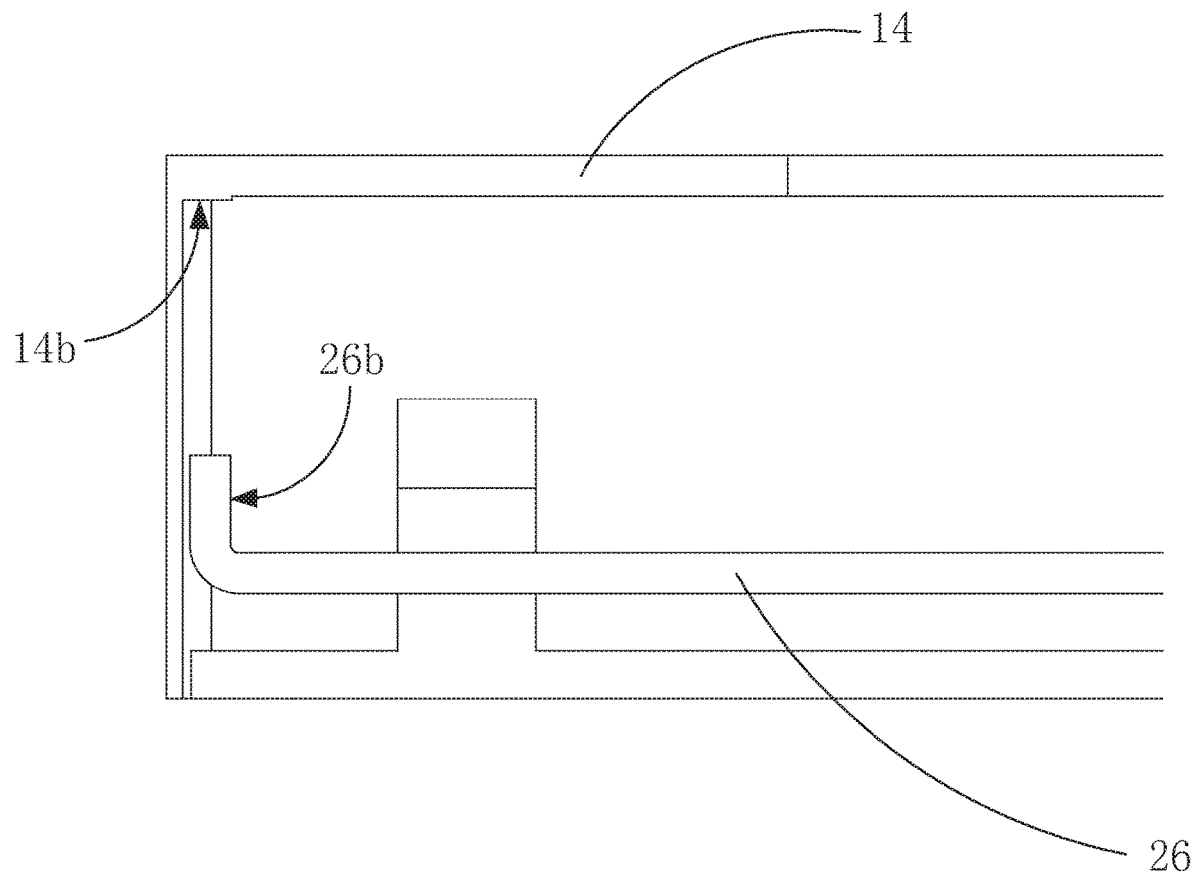
FIG. 21 is a detailed view of a positioning relationship between the lifting plate and the housing in the imaging apparatus according to the embodiment of the present disclosure when photographing.

As shown in FIGS. 11a and 11b, there is a first gap S1 between the nut 25 engaged with the screw 20 and the driven gear 16c. When the nut 25 moves to this area, the nut 25 and the connecting plate 19 are in a non-contact state as shown in FIG. 11b. Specifically, as shown in FIGS. 5 and 10, when the screw 20 is driven to rotate so that the nut 25 moves toward an object side, the lifting plate 26 ascends due to an elastic force exerted by a spring 21, and then the lifting plate 26 drives the connecting plate 19 to ascend so as to keep the connecting plate 19 abutting against the nut 25. When the lifting plate 26 ascends to a photographing state, as shown in FIG. 21, a boss shape 26b provided on the lifting plate 26 facing the object side abuts against an inner surface 14b of the housing 14, so that the lifting plate 26 may not continue to move upward. At this time, since the connecting plate 19 is connected with the lifting plate 26, the connecting plate 19 may not continue to move upward. If the nut 25 is still in contact with the connecting plate 19 when the connecting plate 19 is in a position where it may not continue to move upward as shown in FIG. 11a, a gap between the nut 25 and the driven gear 16c is the first gap S1 defined by the present disclosure. By setting the first gap S1, when the connecting plate 19 is in the position where it may not continue to move upward, the nut 25 may still move upward to any position in the first gap S1 so that the nut 25 is in a non-contact state with the connecting plate 19. When the nut 25 is in the non-contact state with the connecting plate 19, it may be ensured that the spring 21 pushes the connecting plate 19 to a photographing position where the boss shape 26b abuts against the inner surface 14b.

Figure 17:
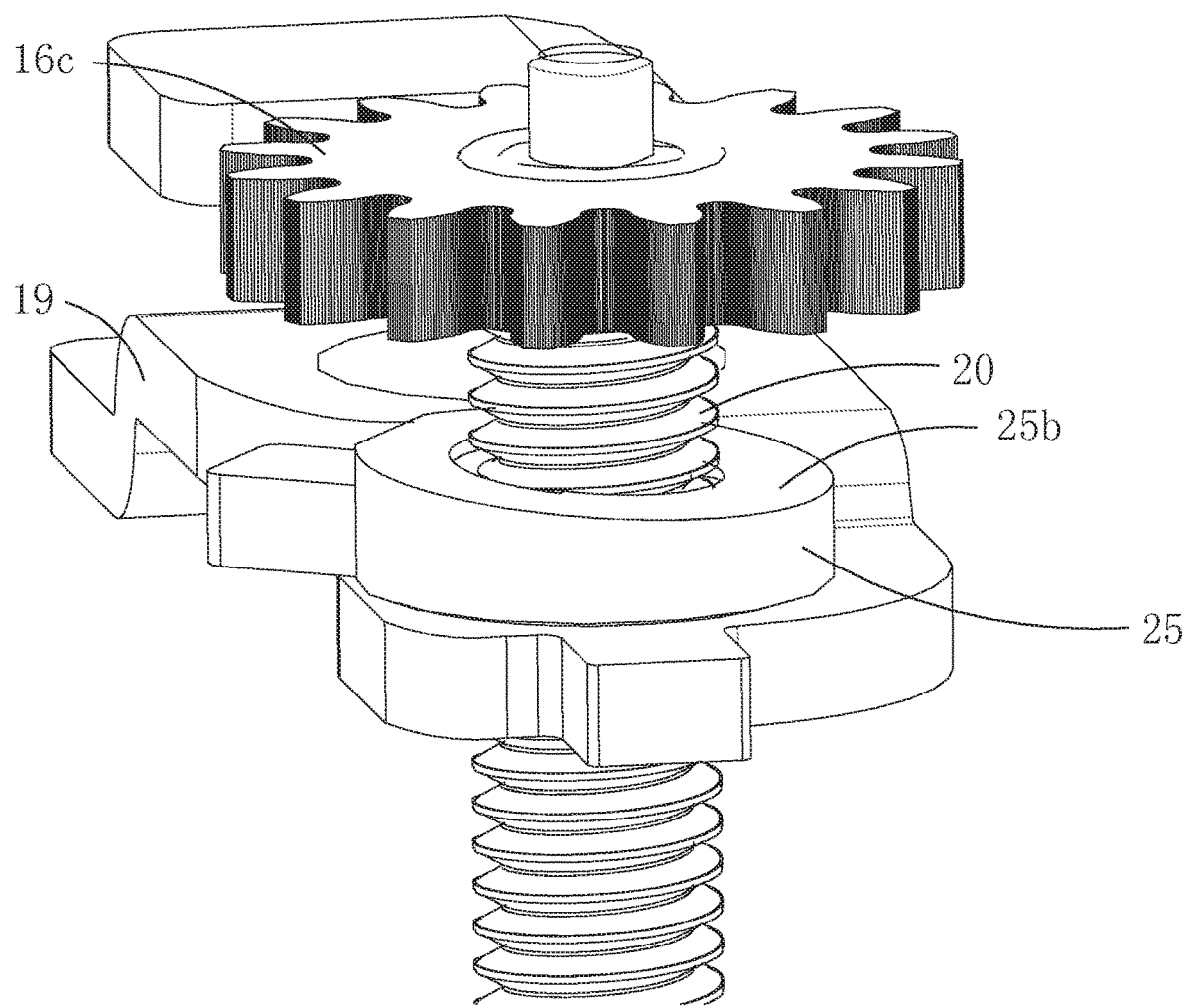
FIG. 17 is a detailed view of a nut inclined surface of the imaging apparatus according to the embodiment of the present disclosure.

As shown in FIG. 17, a surface of the nut 25 adjacent to the driven gear 16c is provided as a nut inclined surface 25b. An angle of inclination between the nut inclined surface 25b and a horizontal plane is approximately the same as a lead angle of the screw 20. By providing the nut inclined surface 25b, if the nut 25 comes into contact with the driven gear 16c due to control failure, the nut 25 is easily separated from the driven gear 16c.

As shown in FIG. 18, the first shaft sleeve 18a is fixed to a middle part of the connecting plate 19, and the first shaft sleeve 18a is sleeved on the spindle 17 together with the connecting plate 19. The connecting plate 19 and the first shaft sleeve 18a may move along the axial direction of the spindle 17 relative to the spindle 17. One side of the connecting plate 19 may be sleeved on the screw 20 in such a way to be movable along the axial direction of the screw 20, and abut against the nut 25. When the screw 20 is driven to rotate, the nut 25 ascends or descends along the screw 20, thereby causing the connecting plate 19 to ascend and descend with the movement of the nut 25. The other side of the connecting plate 19 is connected with the lifting unit. When the connecting plate 19 is driven to descend, the lifting unit is driven to descend.

As shown in FIGS. 5 to 10, the lifting unit includes a countershaft 24, the lifting plate 26 sleeved on the countershaft 24 and movable in an axial direction of the countershaft 24, and the spring 21 sleeved on the countershaft 24 and capable of applying an elastic force to the lifting plate 26 along the axial direction of the countershaft 24.

As shown in FIG. 10, the countershaft 24 is supported by the housing 14 and the cover 15. An axis of the countershaft 24 is parallel to the optical axis O1 and spaced from the spindle 17. The lifting plate 26 moves along the countershaft 24 in a direction parallel to the optical axis O1. The lifting unit may further include a second shaft sleeve 18b sleeved on the countershaft 24 and movable along the axial direction of the countershaft 24. The lifting plate 26 is fixed on the second shaft sleeve 18b, so that the lifting plate 26 may be driven by the second shaft sleeve 18b to move along the axial direction of the countershaft 24.

Figure 19:
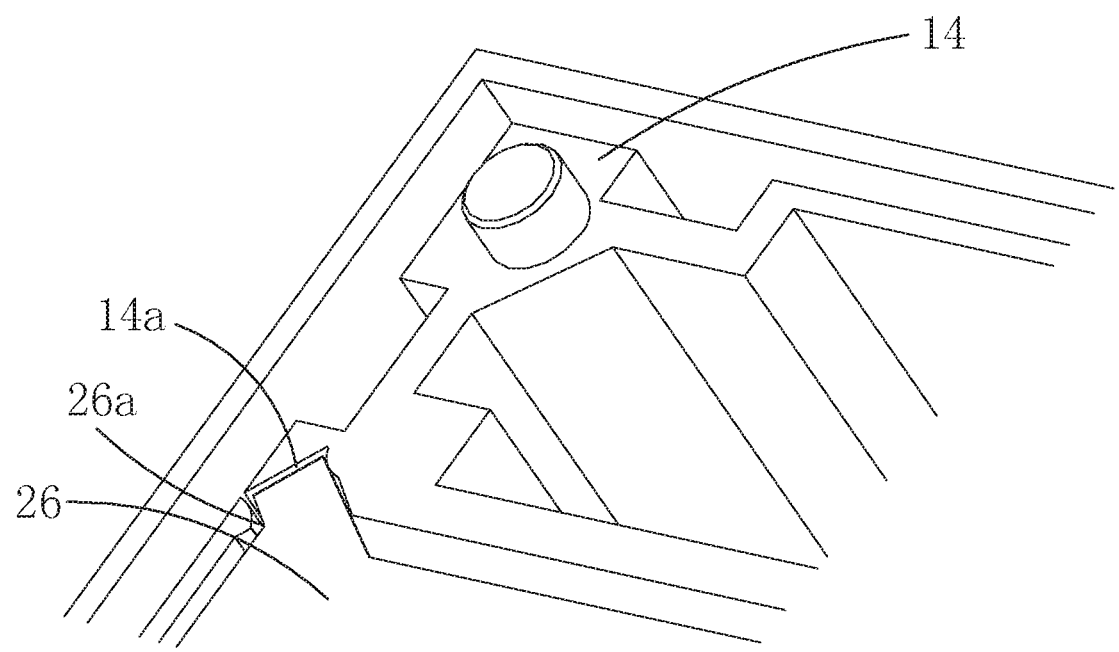
FIG. 19 is a detailed view of a restriction relationship in a rotation direction between a lifting plate and the housing in the imaging apparatus according to the embodiment of the present disclosure.

As shown in FIG. 19, the lifting plate 26 has a lifting plate protrusion 26a which prevents the lifting plate 26 from rotating about the countershaft 24. The lifting plate protrusion 26a is fitted into a housing fitting portion 14a provided on the housing 14 to prevent the lifting plate 26 from rotating about the countershaft 24.

Figure 20:
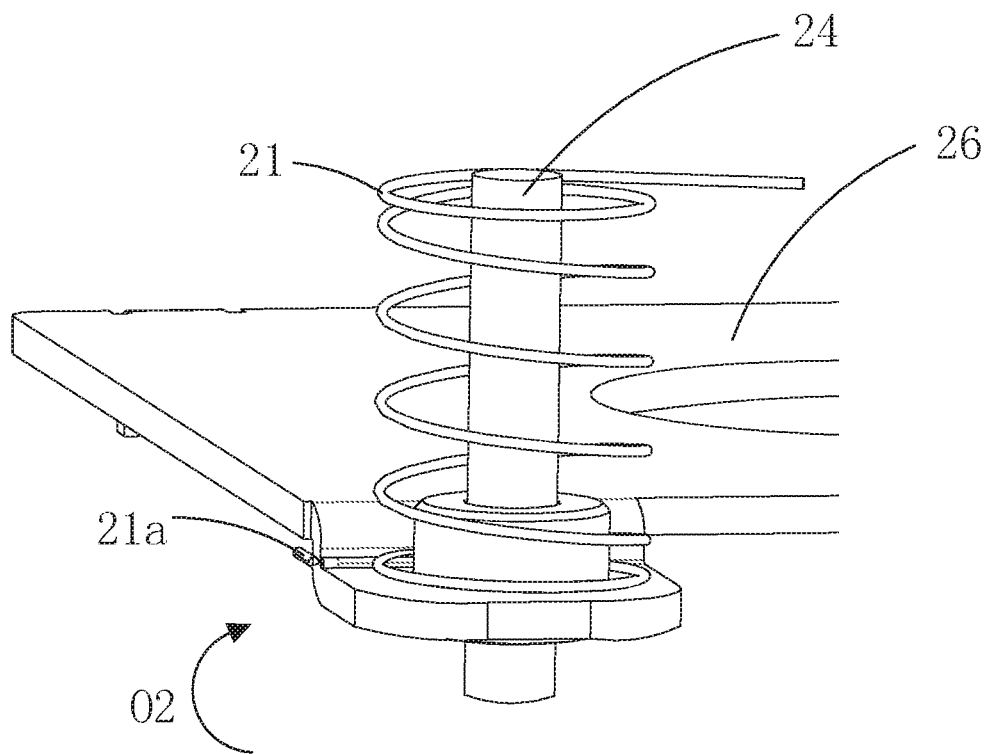
FIG. 20 is a detailed view of a relationship between the lifting plate and a spring in the imaging apparatus according to the embodiment of the present disclosure.

FIG. 20 is a detailed view showing a relationship between the lifting plate 26 and the spring 21 in FIG. 5. In order to show a positional relationship between a spring hook 21a of the spring 21 and the lifting plate 26 more clearly, FIG. 20 shows upside down the lifting plate 26 and the spring 21 in FIG. 5. As shown in FIG. 20, the lifting unit has a spring 21 sleeved on the countershaft 24, and the spring 21 exerts a force toward the object side in the optical axis direction to the lifting plate 26 at any time. When the screw 20 is driven to rotate so that the nut 25 moves toward the object side, the lifting plate 26 ascends due to the elastic force exerted by the spring 21, and then the lifting plate 26 drives the connecting plate 19 to ascend, so that the connecting plate 19 is kept abutting against the nut 25. In addition, the spring 21 may also be provided with the spring hook 21a formed by winding. The spring hook 21a abuts against a side surface of the lifting plate 26, so that the elastic force of the torsion spring may be applied in an O2 direction at any time, thereby further preventing the lifting plate 26 from rotating about the countershaft 24.

As shown in FIG. 21, the lifting plate 26 has the boss shape 26b facing the object side, so that the optical system may position the photographing state. The boss shape 26b may abut against the inner surface 14b of the housing 14.

Figure 8:
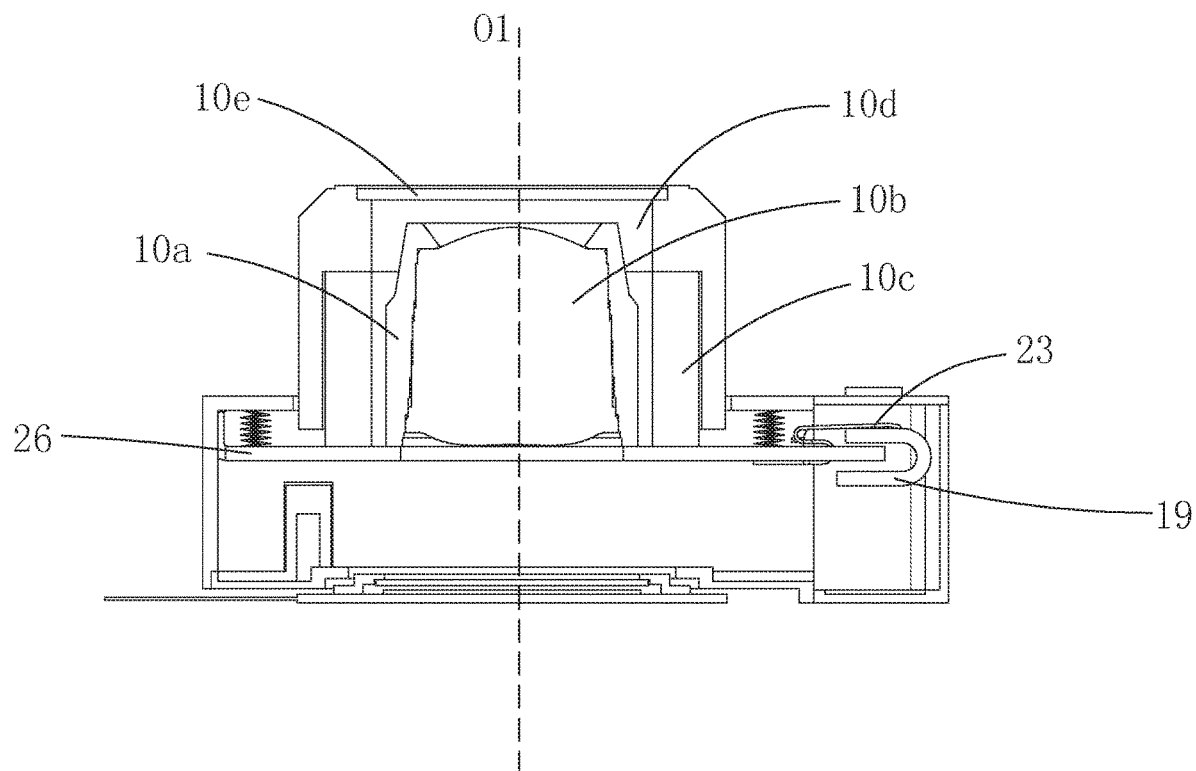
FIG. 8 is a cross-sectional view of the imaging apparatus according to the embodiment of the present disclosure in a state where a lens group is extended, taken from a plane parallel to an optical axis.

As shown in FIG. 8, the lifting unit may further include a leaf spring 23, and the lifting plate 26 and the connecting plate 19 may be connected by the leaf spring 23. One end of the leaf spring 23 is fixed to one side of the lifting plate 26, and the other end abuts against the connecting plate 19 and applies an elastic force to the connecting plate 19. As described above, the lifting plate 26 and the connecting plate 19 move synchronously. When the nut 25 pushes the lifting plate 26 to descend, the connecting plate 19 abuts against the lifting plate 26 through the leaf spring 23 and descends with the lifting plate 26, thereby pressing the spring 21 downward. During the ascent of the lifting plate 26, due to the rotation of the screw 20, the nut 25 is ascended by the elastic force of the spring 21 while keeping the lifting plate 26 in contact with the connecting plate 19. When an external force is applied to the imaging apparatus 100 from the outside in the optical axis direction, an external impact may be alleviated by the leaf spring 23 and the spring 21.

Figure 9:
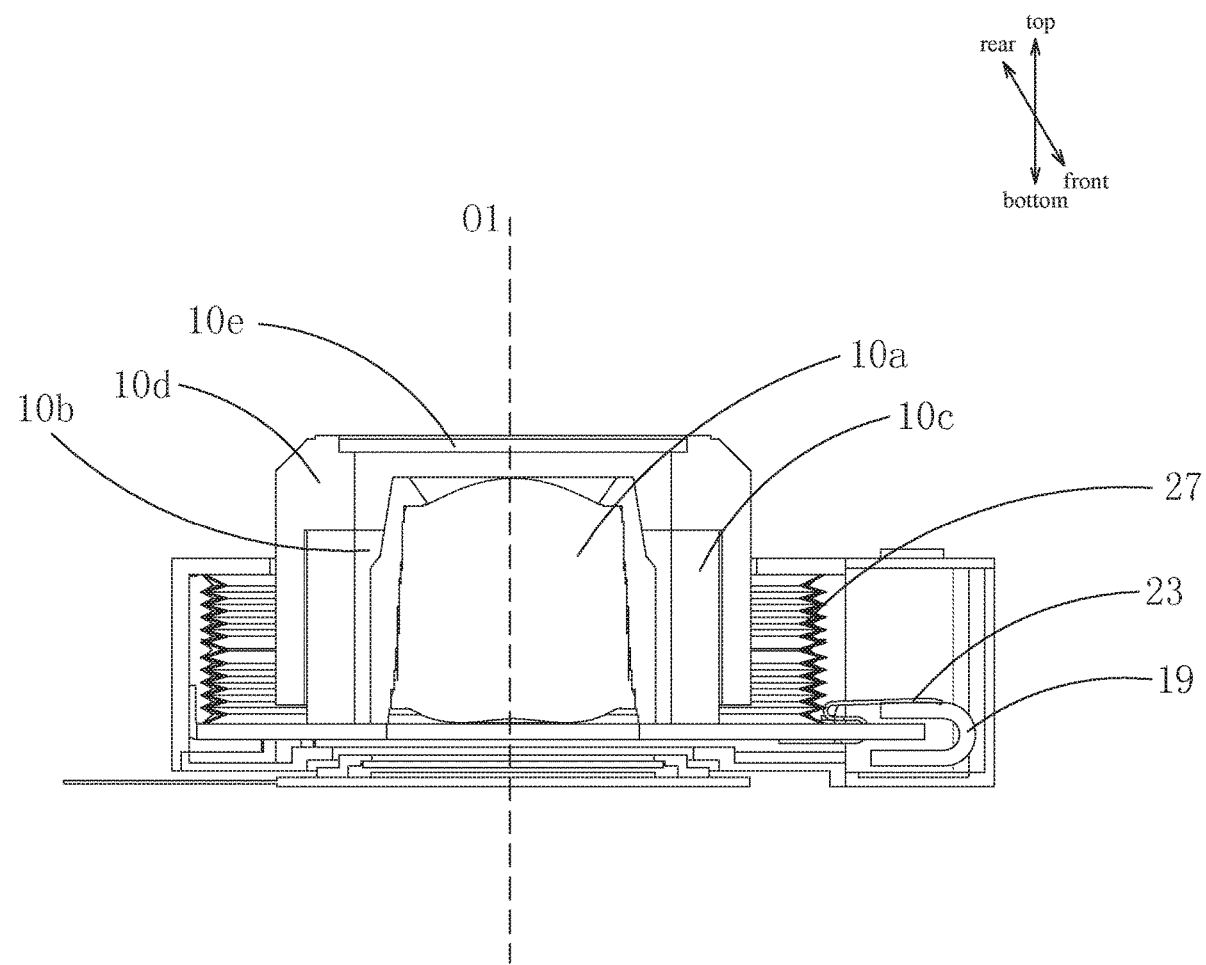
FIG. 9 is a cross-sectional view of the imaging apparatus according to the embodiment of the present disclosure in a state where the lens group is retracted, taken from a plane parallel to the optical axis.

As shown in FIGS. 8 and 9, the optical assembly includes a telescopic cylindrical member 27 disposed between the housing 14 and the lifting plate 26. With the telescopic cylindrical member 27, it is possible to minimize an intrusion of dust and water from the outside into the imaging assembly. The optical assembly further includes the lens group 10a, a lens barrel 10b for fixing the lens group 10a, the cover glass 10e provided at an end of the lens group 10a adjacent to the object side, a decorative sleeve 10d, and an anti-shake-focus-adjustment assembly 10c.

Figure 22:
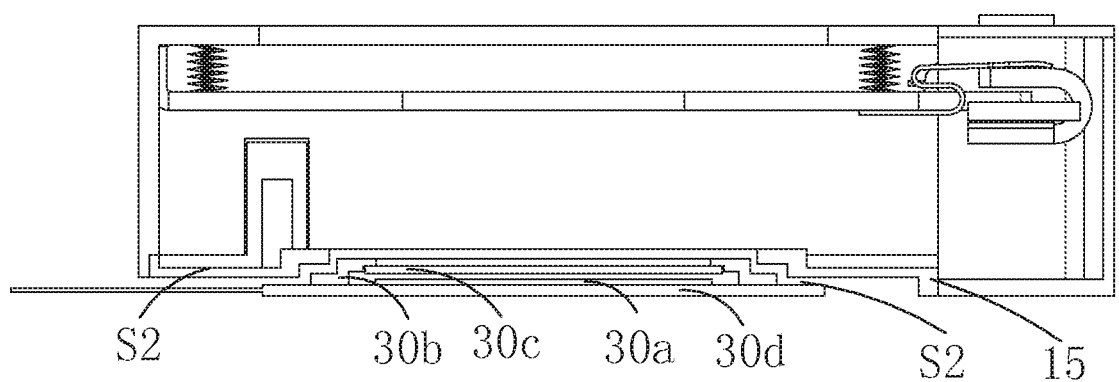
FIG. 22 is a detailed view of a relationship between a cover and the periphery of the imaging component in the imaging apparatus according to the embodiment of the present disclosure.

As shown in FIG. 22, the imaging assembly includes an imaging component substrate 30d, an imaging component 30a disposed above the imaging component substrate 30d, an infrared cut filter 30c disposed above the imaging component 30a, and an imaging component housing 30b fixed on the imaging component substrate 30d. A space formed by the imaging component substrate 30d and the imaging component housing 30b is used to accommodate the imaging component 30a and the infrared cut filter 30c. The imaging assembly is disposed in a recessed space at the bottom of the cover 15, and a second gap S2 is formed between the imaging assembly and the cover 15. When the imaging assembly is being fixed to the cover 15, the second gap S2 is used to correct the optical axis of the imaging assembly.

Figure 23:
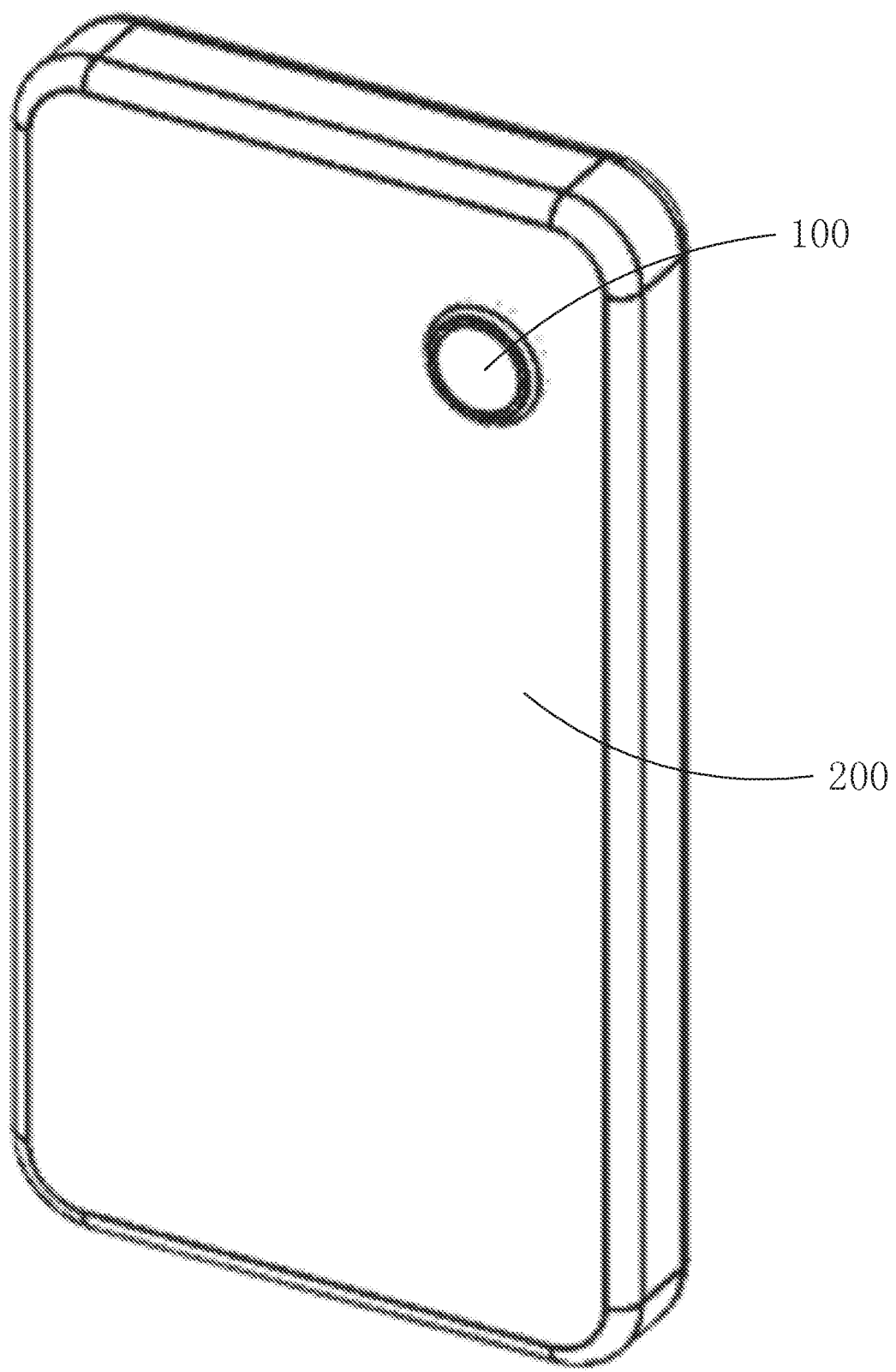
FIG. 23 is a portable electronic device (portable information terminal) equipped with the imaging apparatus of the present disclosure.

As shown in FIG. 23, the above-described imaging apparatus 100 may also be applied to the imaging apparatus 100 for a portable electronic device 200 such as a so-called smart phone, a so-called functional phone, or a tablet device.

The above is only the preferred embodiments of the present disclosure, and the protection scope of the present disclosure is not limited to the above embodiments. Equivalent modifications or variations made by those skilled in the art based on the contents disclosed in the present disclosure are included in the present disclosure described in the scope to be protected by the present disclosure.

What is claimed is:

1. An optical assembly driving apparatus, comprising an actuator unit and a lifting unit configured to support an optical assembly, wherein the actuator unit comprises an electromagnetic motor serving as a driving source and a transmission mechanism transmitting a driving force to the lifting unit, the transmission mechanism comprises a spindle and a connecting plate sleeved on the spindle and movable along an axial direction of the spindle, the connecting plate is connected with the lifting unit, and the driving force generated by the electromagnetic motor controls lifting by the lifting unit through the connecting plate;
the lifting unit comprises a countershaft, a lifting plate sleeved on the countershaft and movable along an axial direction of the countershaft, and a spring sleeved on the countershaft and configured to apply an elastic force to the lifting plate along the axial direction of the countershaft,
wherein the lifting unit comprises a leaf spring, and the leaf spring has one end fixed on the lifting plate and one other end abutting against the connecting plate and configured to apply an elastic force to the connecting plate.

2. The optical assembly driving apparatus according to claim 1, wherein the transmission mechanism further comprises a driving gear mounted on the electromagnetic motor, an intermediate gear engaged with the driving gear, a driven gear engaged with the intermediate gear, a screw fixed to the driven gear and a nut threaded to the screw, the nut abuts against the connecting plate, and axes of the driving gear, the intermediate gear, the driven gear and the screw are parallel to an optical axis of the optical assembly and an axis of the electromagnetic motor.

3. The optical assembly driving apparatus according to claim 2, wherein the nut has a nut protrusion configured to prevent the nut from rotating.

4. The optical assembly driving apparatus according to claim 2, wherein the connecting plate has a connecting plate protrusion configured to prevent the connecting plate from rotating.

5. The optical assembly driving apparatus according to claim 2, wherein a surface of the nut adjacent to the driven gear is provided as a nut inclined surface.

6. The optical assembly driving apparatus according to claim 1, wherein the lifting plate has a lifting plate protrusion configured to prevent the lifting plate from rotating about the countershaft.

7. The optical assembly driving apparatus according to claim 1, wherein the actuator unit comprises a position detection sensor.

8. An imaging apparatus, comprising a housing, an optical assembly and an optical assembly driving apparatus, wherein the optical assembly is driven by the optical assembly driving apparatus in such a way that the optical assembly extends out or retracts to the housing along an optical axis direction; and
wherein the optical assembly driving apparatus comprises an actuator unit and a lifting unit configured to support an optical assembly, the actuator unit comprises an electromagnetic motor serving as a driving source and a transmission mechanism transmitting a driving force to the lifting unit, the transmission mechanism comprises a spindle and a connecting plate sleeved on the spindle and movable along an axial direction of the spindle, the connecting plate is connected with the lifting unit, and the driving force generated by the electromagnetic motor controls lifting by the lifting unit through the connecting plate;
the lifting unit comprises a countershaft, a lifting plate sleeved on the countershaft and movable along an axial direction of the countershaft, and a spring sleeved on the countershaft and configured to apply an elastic force to the lifting plate along the axial direction of the countershaft,
wherein the lifting unit comprises a leaf spring, and the leaf spring has one end fixed on the lifting plate and one other end abutting against the connecting plate and configured to apply an elastic force to the connecting plate.

9. The imaging apparatus according to claim 8, wherein the optical assembly comprises a telescopic cylindrical member arranged between the housing and the lifting plate.

10. The imaging apparatus according to claim 8, wherein the housing further comprises a housing fitting portion configured to prevent the lifting plate of the optical assembly driving apparatus from rotating.

11. A portable electronic device, comprising an imaging apparatus, wherein the imaging apparatus comprises a housing, an optical assembly and an optical assembly driving apparatus;
wherein the optical assembly is driven by the optical assembly driving apparatus in such a way that the optical assembly extends out or retracts to the housing along an optical axis direction; and
wherein the optical assembly driving apparatus comprises an actuator unit and a lifting unit configured to support an optical assembly, the actuator unit comprises an electromagnetic motor serving as a driving source and a transmission mechanism transmitting a driving force to the lifting unit, the transmission mechanism comprises a spindle and a connecting plate sleeved on the spindle and movable along an axial direction of the spindle, the connecting plate is connected with the lifting unit, and the driving force generated by the electromagnetic motor controls lifting by the lifting unit through the connecting plate;
the lifting unit comprises a countershaft, a lifting plate sleeved on the countershaft and movable along an axial direction of the countershaft, and a spring sleeved on the countershaft and configured to apply an elastic force to the lifting plate along the axial direction of the countershaft, wherein the lifting unit comprises a leaf spring, and the leaf spring has one end fixed on the lifting plate and one other end abutting against the connecting plate and configured to apply an elastic force to the connecting plate.

* * * * *